May 20, 1952   E. F. BRITTEN, III   2,597,774
GRASS TRIMMER
Filed Oct. 28, 1948   7 Sheets-Sheet 1
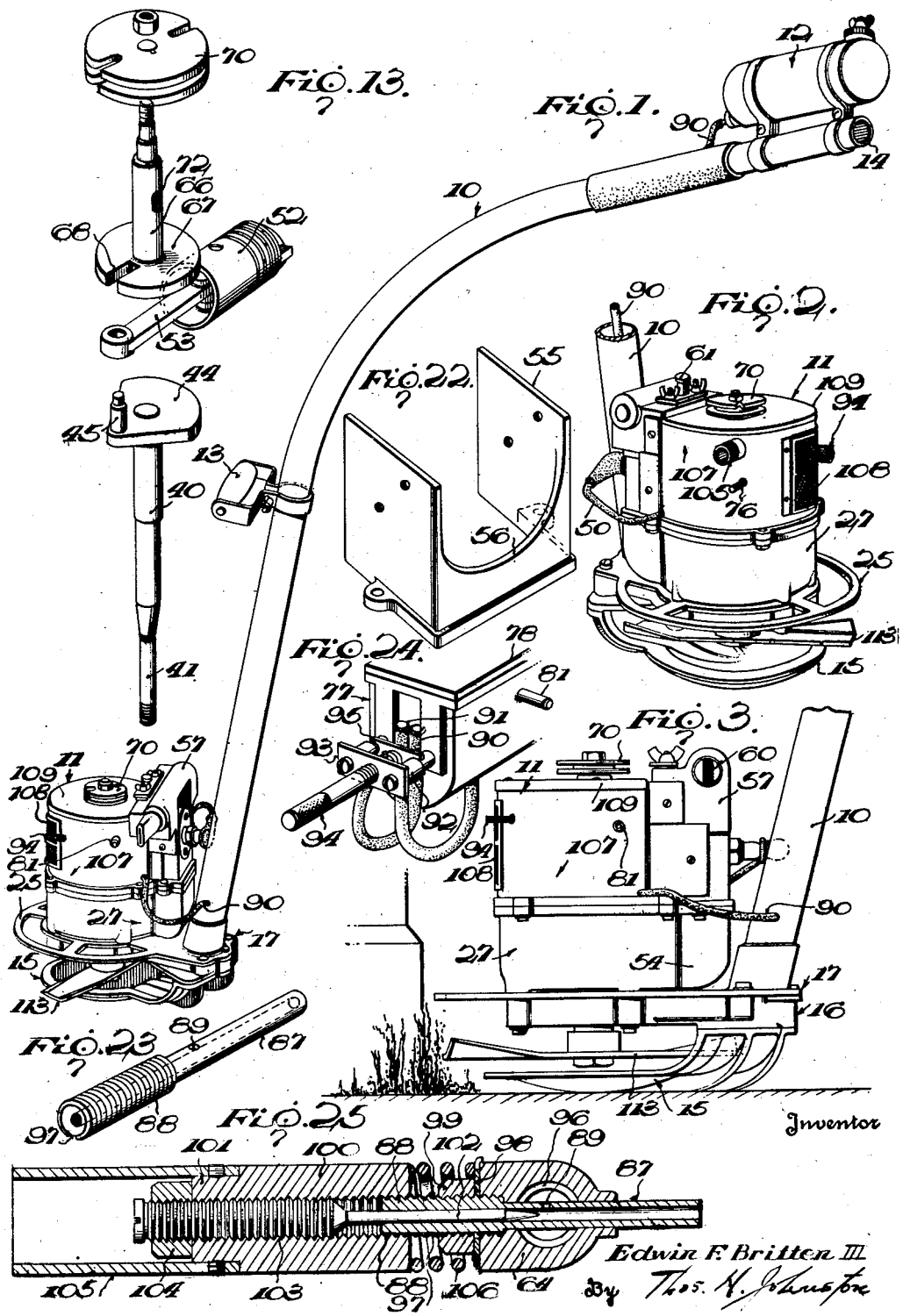
Inventor
Edwin F. Britten III
By Thos. H. Johnston May 20, 1952  E. F. BRITTEN, III  2,597,774
GRASS TRIMMER
Filed Oct. 28, 1948  7 Sheets-Sheet 2
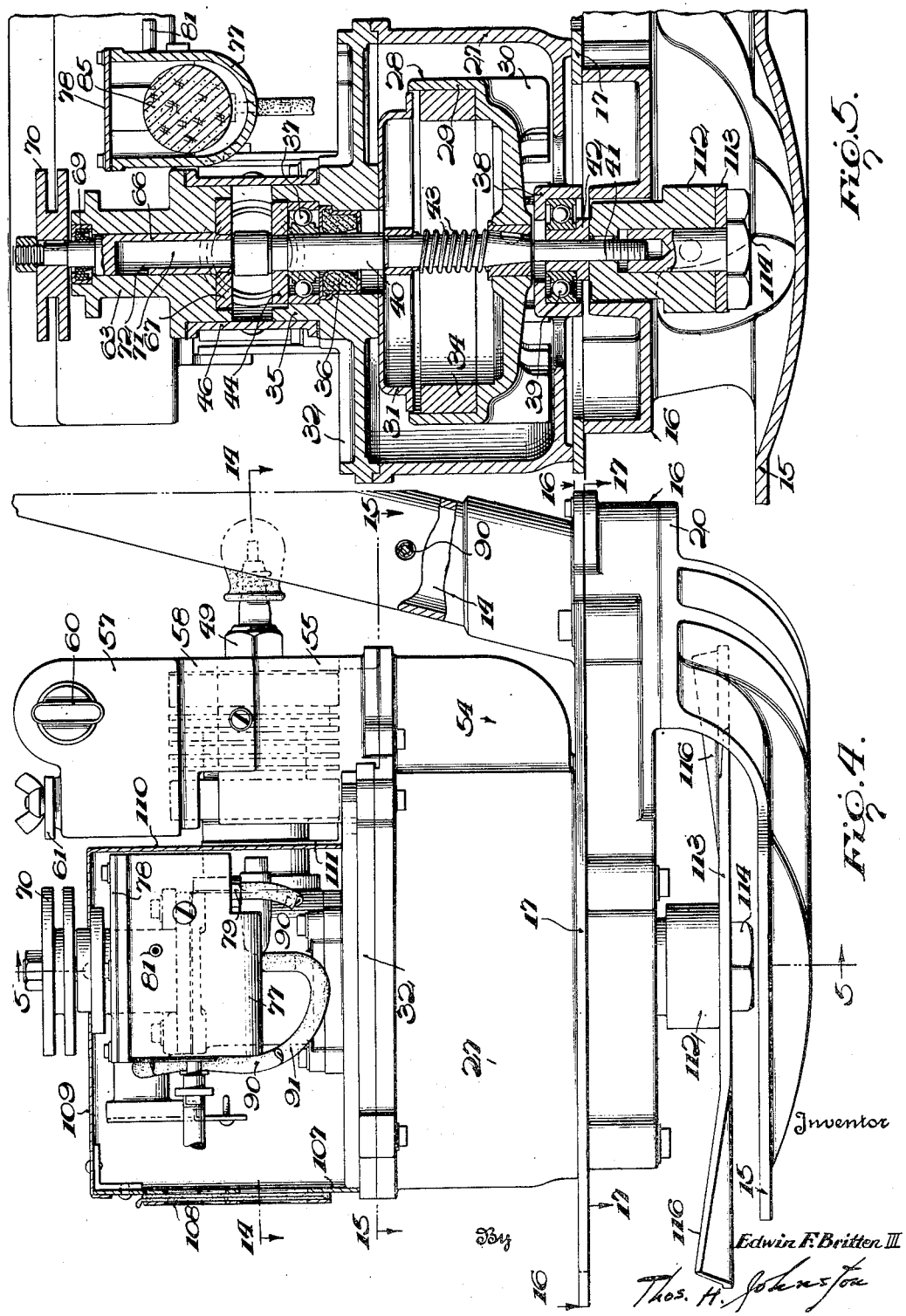
Inventor
Edwin F. Britten III
Thos. H. Johnston

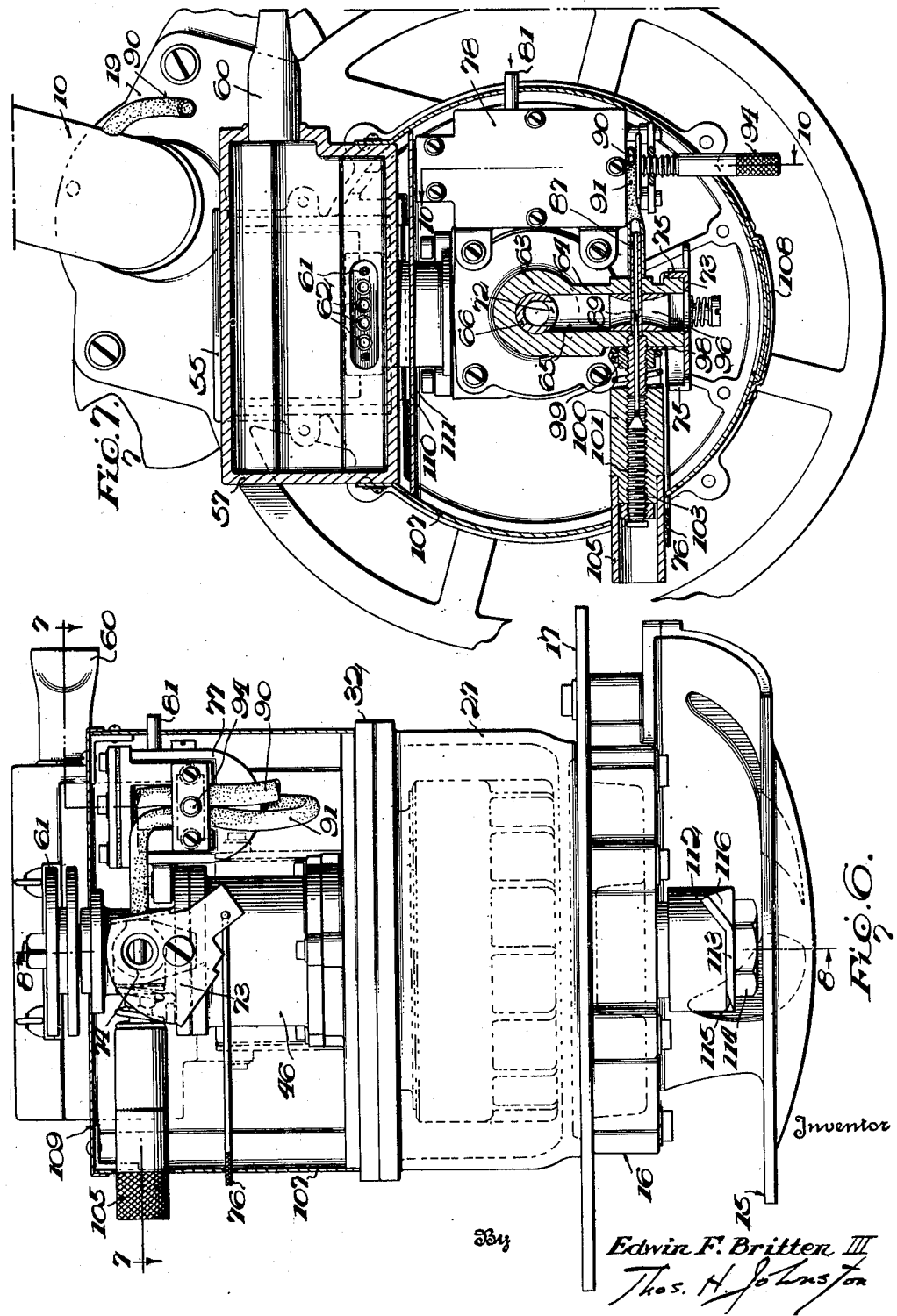

May 20, 1952     E. F. BRITTEN, III     2,597,774
GRASS TRIMMER
Filed Oct. 28, 1948     7 Sheets-Sheet 4
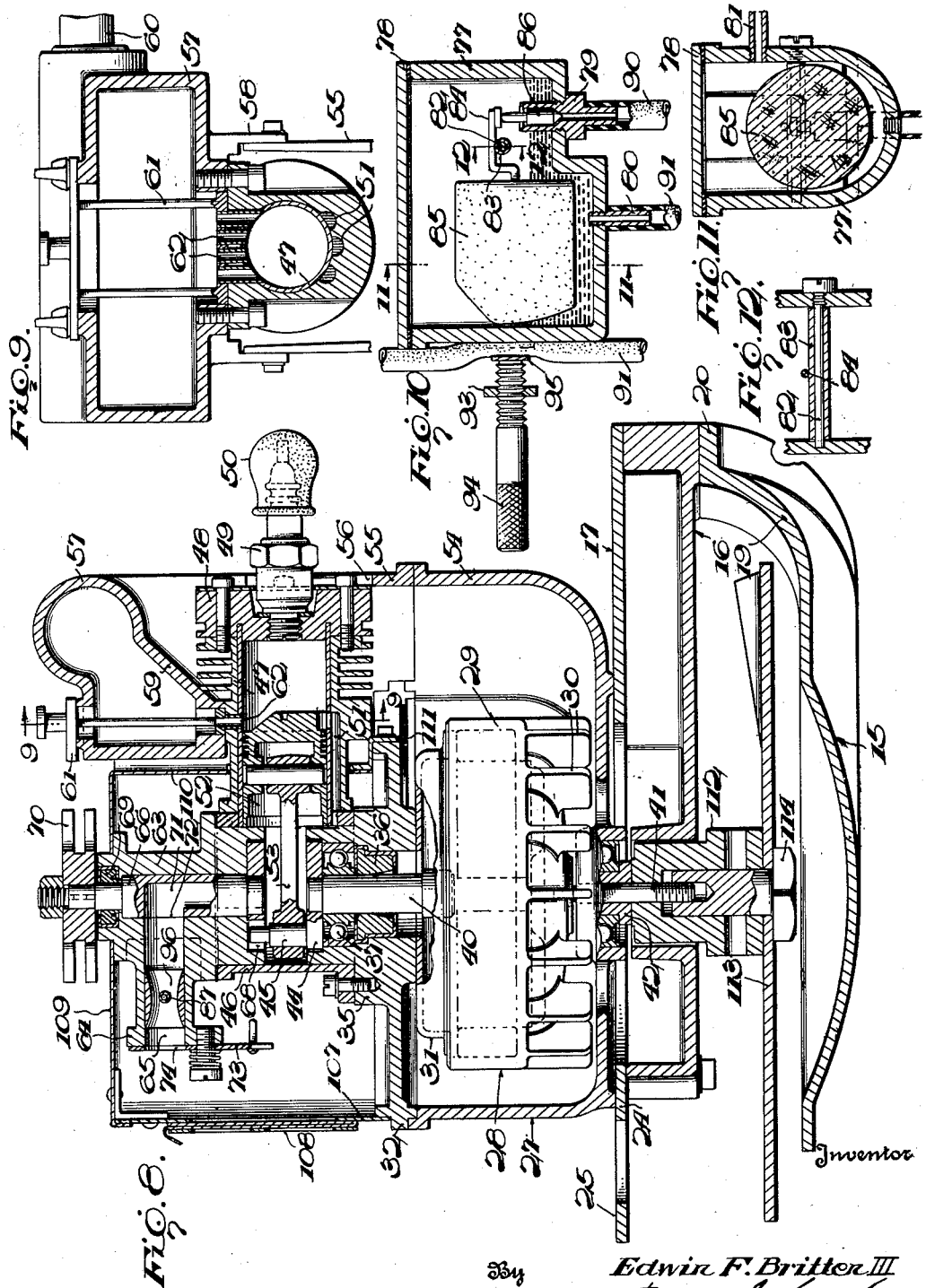

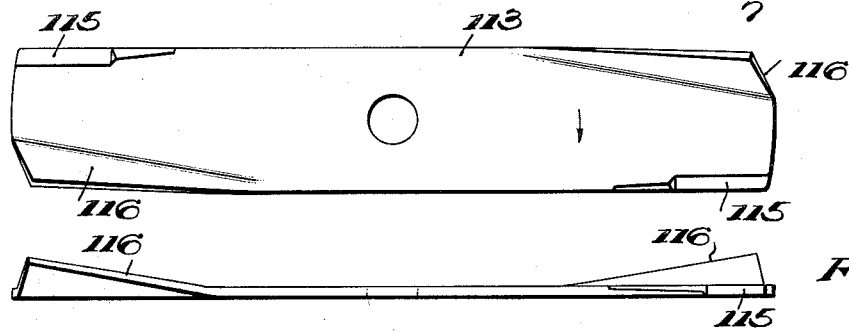
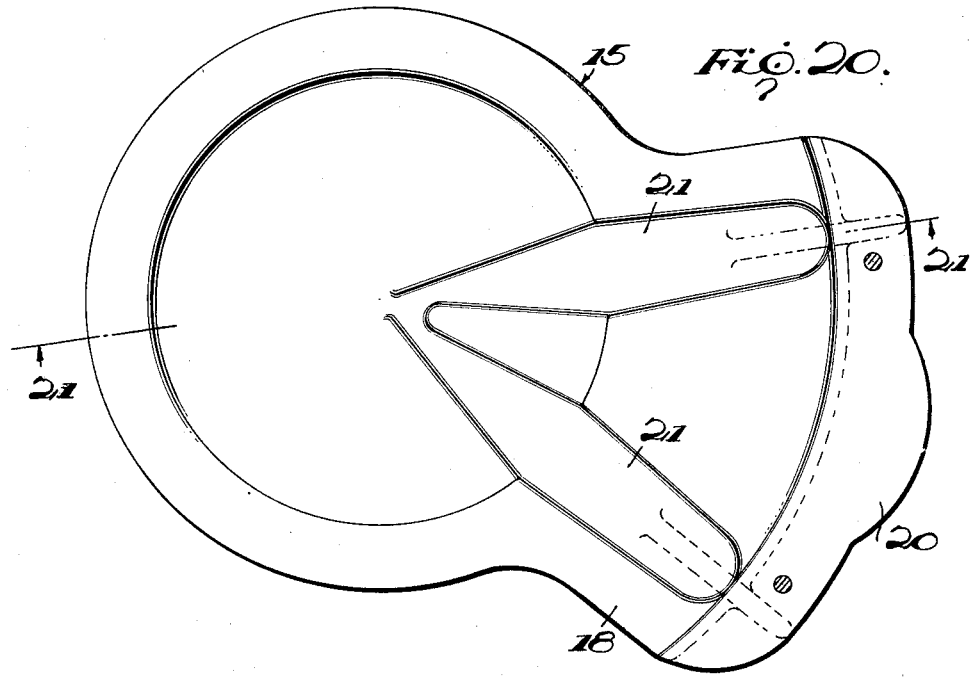
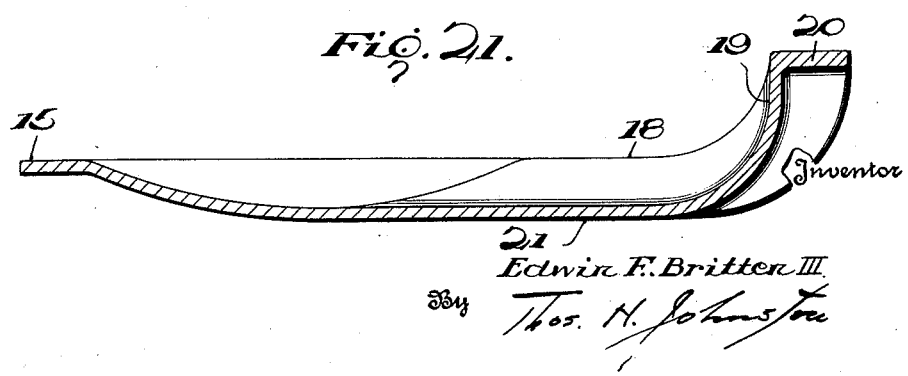

Patented May 20, 1952

2,597,774

UNITED STATES PATENT OFFICE 2,597,774

GRASS TRIMMER

Edwin F. Britten, III, Cranford, N. J.

Application October 28, 1948, Serial No. 57,041

10 Claims. (Cl. 56—25.4)

This invention relates to an improved grass trimmer of the character employing a vertical shaft, and a cutting blade carried by said shaft to rotate in a plane at a right angle to the shaft.

Heretofore, hand-portable grass trimmers of this kind have, in so far as I am aware, employed an electric motor for driving the vertical blade-operating shaft, such a motor being the best available as regards compactness and weight, to be carried at the lower end of a handle by a workman and manipulated by the handle in trimming grass. However, an electric motor for the purpose necessarily involves, for extended work, a separate expensive portable generator unit. Furthermore, due to the up-draft of air created by the rotating cutting blade, if the grass being trimmed is at all wet, as with dew or after a rain, moisture is blown into and over the motor of the trimmer with consequent short circuits and other operating troubles. The long electrical lead necessary between the generator unit and the motor is also a handicap.

Heretofore, also, various attempts have been made, by the use of an internal combustion engine as a prime mover for the cutting blade, to forestall the foregoing outlined difficulties attendant upon the use of a handle-carried electric motor, but in all such instances, in so far as I have been able to discover, the engine is heavy and cumbersome and involves the use of a carriage, truck, or the like on wheels, with the result that the advantages of a hand-portable device, particularly for working in close obstructed areas, are entirely lost.

An object of the present invention, therefore, is to provide a handle-carried device incorporating an internal combustion engine for driving the cutting blade, and wherein the engine will be so compact and light in weight as to render the device entirely feasible and handy, and susceptible of convenient manipulation by a workman without reaction of cumbersomeness or over-burdening load.

Another object of the invention is to provide a device involving a cutting head, including the engine, and wherein, in so far as possible, all of the parts will be formed of light weight metal, thus to provide a cutting head of minimum feasible weight.

Still another and equally important object of the invention is to provide an engine which will be air cooled, wherein the provisions made will not only be efficient, but unique in that the indrawn cooling air stream will be supplied through the handle, subsequently subjected, itself, to the cooling influences of the up-draft of air created by the rotating cutting blade, and then thereafter be impelled about the engine cylinder to issue finally against the exhaust manifold, thus to not only cool the cylinder but also to carry off the excess heat of the manifold.

Another object of the invention is to provide a device so devised that the major parts thereof may be manufactured in separate distinct units capable of assembly as such, and likewise capable of replacement as such, so that upon failure of any given unit, a new unit may be conveniently substituted without an over-all repair of the whole.

The invention has other objects as regards the compactness of the cutting head, the ingenious use of certain parts to accomplish dual purposes, and structural originality regarding the engine itself, but emphasis in these respects would seem better left to the following description of the invention.

In the drawings:

Figure 1 is a perspective view of my improved grass trimmer.

Figure 2 is an enlarged perspective view of the cutting head.

Figure 3 is an enlarged side elevation of the cutting head.

Figure 4 is a further enlarged view partly in elevation and partly in section of the cutting head.

Figure 5 is a section on the line 5—5 of Figure 4.

Figure 6 is a front elevation of the cutting head, parts being shown in section.

Figure 7 is a section on the line 7—7 of Figure 6.

Figure 8 is a section on the line 8—8 of Figure 6.

Figure 9 is a section on the line 9—9 of Figure 8.

Figure 10 is a section on the line 10—10 of Figure 7.

Figure 11 is a section on the line 11—11 of Figure 10.

Figure 12 is a section on the line 12—12 of Figure 10.

Figure 13 is a perspective view showing the engine crank shaft, piston, intake valve, and starter pulley of the engine, the parts being separated but in proper relative position.

Figures 18 and 19 are, respectively, a plan view and edge elevation of the cutting blade.

Figure 20 is a plan view of the ground shoe of the device.

Figure 21 is a section on the line 21—21 of Figure 20.

Figure 22 is a detail perspective view of the air flue employed.

Figure 23 is a detail perspective view of the fuel tube.

Figure 24 is a detail perspective view of the fuel shut-off device employed.

Figure 25 is an enlarged sectional view of the needle valve assembly.

Figure 14:
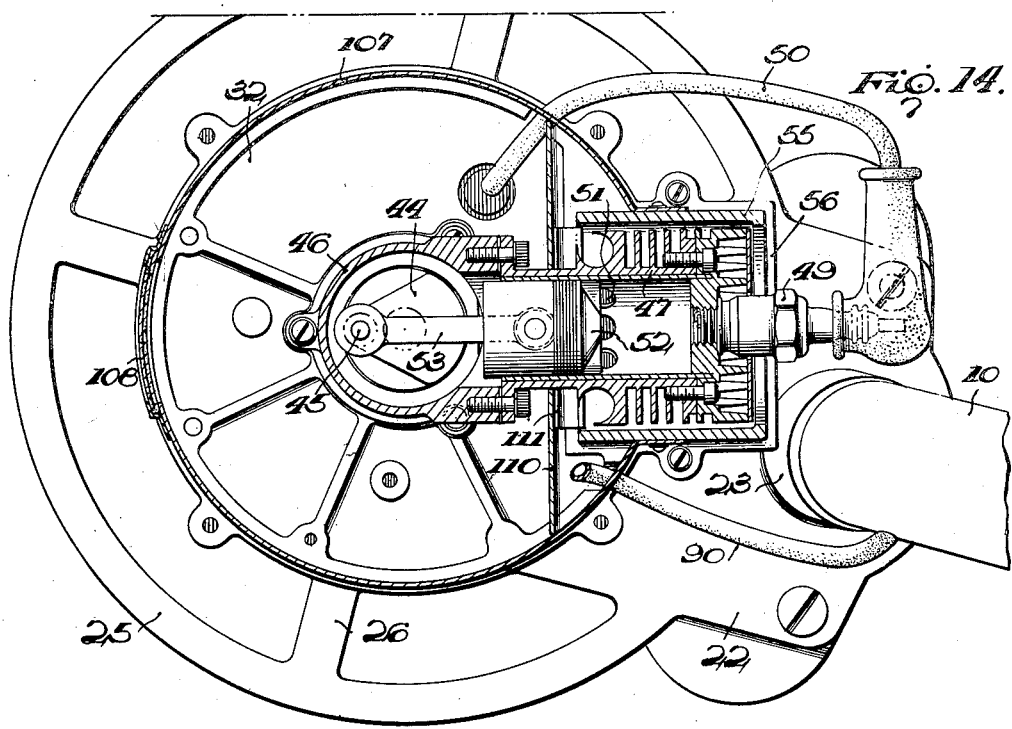
Figure 14 is a section on the line 14—14 of Figure 4.

The device as a whole, as seen in Figure 1 of the drawings, comprises a curved handle 10, a cutting head 11 at the lower inner end of the handle, and a fuel tank 12 at the outer end of the handle. The handle 10 is preferably provided with a straight inner stem joined to the head 11, and a more or less straight outer end portion which carries the tank 12. The tank 12 is of no particular importance as regards its structural details or how mounted. It is to be noted, however, that the tank 12 provides a counterweight for the head 11, and adjustably fixed to the handle is an intermediate hand-grip 13. Thus, a workman grasping the outer end of the handle 10 say in the right hand and grasping the grip 13 in the left hand may, by adjusting the grip 13 longitudinally of the handle, somewhat balance the weight of the device as a whole. This feature is of importance as, in actual practice, it contributes so much to the convenient use and easy poise of the device. It is further to be noted that the handle 10 is tubular and provides an air inlet duct 14.

The cutting head 11 may now be considered. To begin at the bottom, I employ, as perhaps best seen in Figures 4 and 8, a ground shoe 15, next above, an elongated air dish 16, and, next above, a cover plate 17 for said dish. These parts will be taken up in sequence.

Figures 20 and 21 of the drawings show the ground shoe 15 in detail. As will be observed, said shoe is dished downwardly in the middle and is provided with a neck 18 which merges into an upwardly curved head 19 having a lateral flange 20, ribs 21 in V-shaped relationship being provided exteriorly of the shoe at the heel portion thereof.

Figure 17:
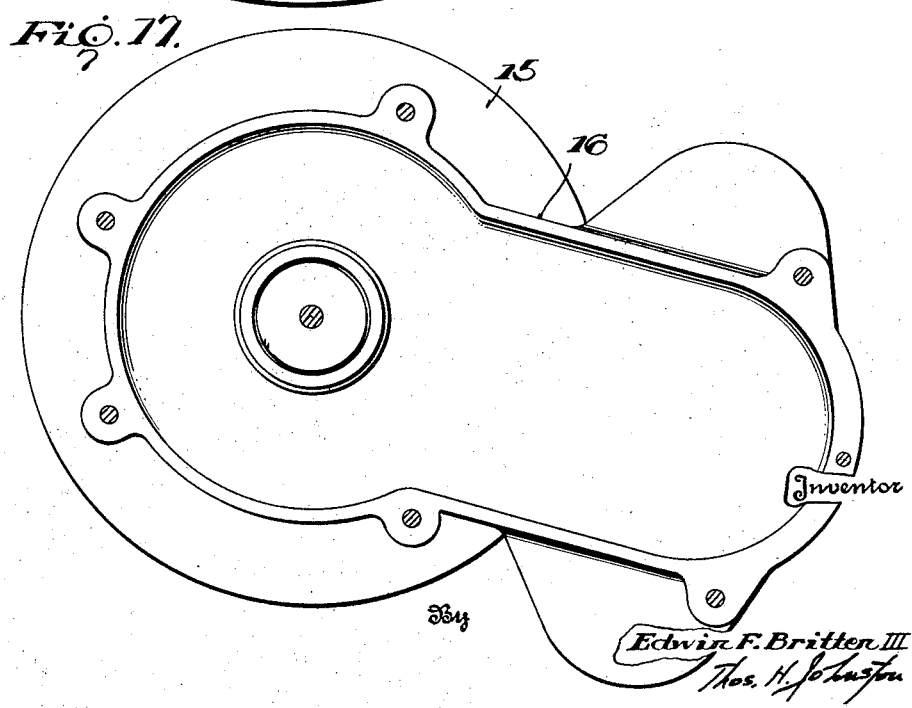
Figure 17 is a section on the line 17—17 of Figure 4.

The air dish 16 is best seen in Figures 4, 8, and 17 of the drawings. Looking at Figure 17, it will be seen that the air dish comprises an elongated body rectangular at its outer end portion and cylindrical at its inner end portion. The flange 20 of the head 19 of the ground shoe 15 fits the outer end portion of the air dish, to which it is detachably secured. The depth of the air dish is a matter of choice, as well as the spacing between the shoe 15 and said dish.

Figure 16:
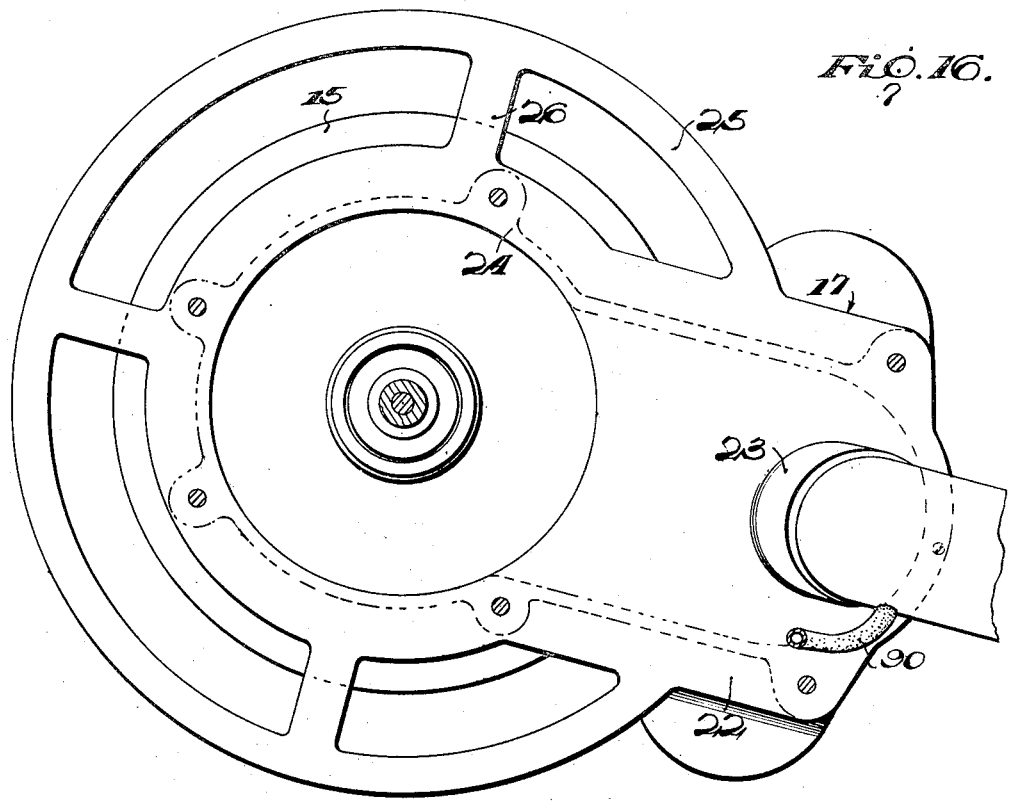
Figure 16 is a section on the line 16—16 of Figure 4.

The cover plate 17 is perhaps best seen in Figure 16 of the drawings. This plate comprises a head 22 carrying a collar 23. Integral with the head is an inner ring 24 and an outer guard ring 25 joined with the inner ring by spaced webs 26. The cover plate is detachably secured to the air dish 16 thereover and provides, through the medium of the collar 23, a means whereby the handle 10 is fixed at its inner end to said plate, so that the duct 14 of the handle thus opens into the air dish. The purpose of the guard ring 25 will later appear.

The air fan employed and associated parts may now be considered.

As seen in Figures 4 and 8 of the drawings, I provide a cylindrical bowl-shaped fan housing 27 which rests upon the cover plate 17 of the air dish 16 and is detachably secured to both by cap screws extending upwardly through said plate. Within the fan housing is provided a fan 28 in the form of a cylindrical casing 29 provided at the bottom peripheral portion thereof with radial fan blades 30. Thus, as will be seen so far, rotation of the fan 28 will serve to draw in a cooling air stream through the duct 14 of the handle 10 into the air dish 16, thence through the central opening of the cover plate 17, and thence into the fan housing 27.

The casing 29 is closed at its upper end by a head plate 31 detachably fixed to the under side of a cover plate 32, in turn detachably secured to the housing 27, so that the fan 28 may turn freely about said head plate. Arranged within the fan casing 29 is a suitable magneto, indicated as a whole in dotted lines in Figure 15 at 33.

The structural details of the magneto 33 are not important, and the showing is intended as merely conventional. However, it is to be observed that, as shown in Figure 5, the rotating field magnet 34 of the magneto is carried by the fan casing 29. Thus, a magneto, casing therefor, and fan are, in the present instance, all embodied in a single unit.

The engine employed and associated parts may now be considered.

Formed on the cover plate 32, as seen in Figures 5 and 8 of the drawings, is a bearing sleeve 35, in which is disposed a gland 36, and overlying said gland is an upper bearing 37. Formed on the bottom wall of the fan housing 27 is a bearing cup 38, and positioned in said cup is a lower bearing 39. Journaled by the bearings 37 and 39 is a crank shaft 40, seen in detail in Figure 13. The crank shaft is provided at its lower end portion with a tail stem 41, and surrounding said stem is a bushing 42 received by the lower bearing 39. As will be observed, the fan casing 29 is keyed to said shaft to turn therewith about the head plate 31 for said casing, and interposed between these parts about the crank shaft is a spring 43 tending to prevent the casing from grinding against the head plate. At its upper end, the crank shaft 40 carries a cheek plate 44 which overlies the bearing 37, and upstanding from said plate is a crank pin 45.

Detachably fixed to the bearing sleeve 35 is an upstanding crank case 46 to one side of which is removably secured a horizontally disposed cylinder 47 closed at its outer end by a detachable cylinder head 48 carrying a spark plug 49. Operatively connecting the spark plug with the magneto 33 is a lead 50. The engine is two-cycle, and the cylinder 47 includes appropriate ducts 51 for conducting fuel gases from the crank case 46 into the outer end portion of the cylinder, as will be well understood. Reciprocable in the cylinder is a piston 52 coupled with the crank pin 45 by a connecting rod 53. Thus, as the piston is driven, the crank shaft 40 will be rotated to turn the fan 28.

Figure 15:
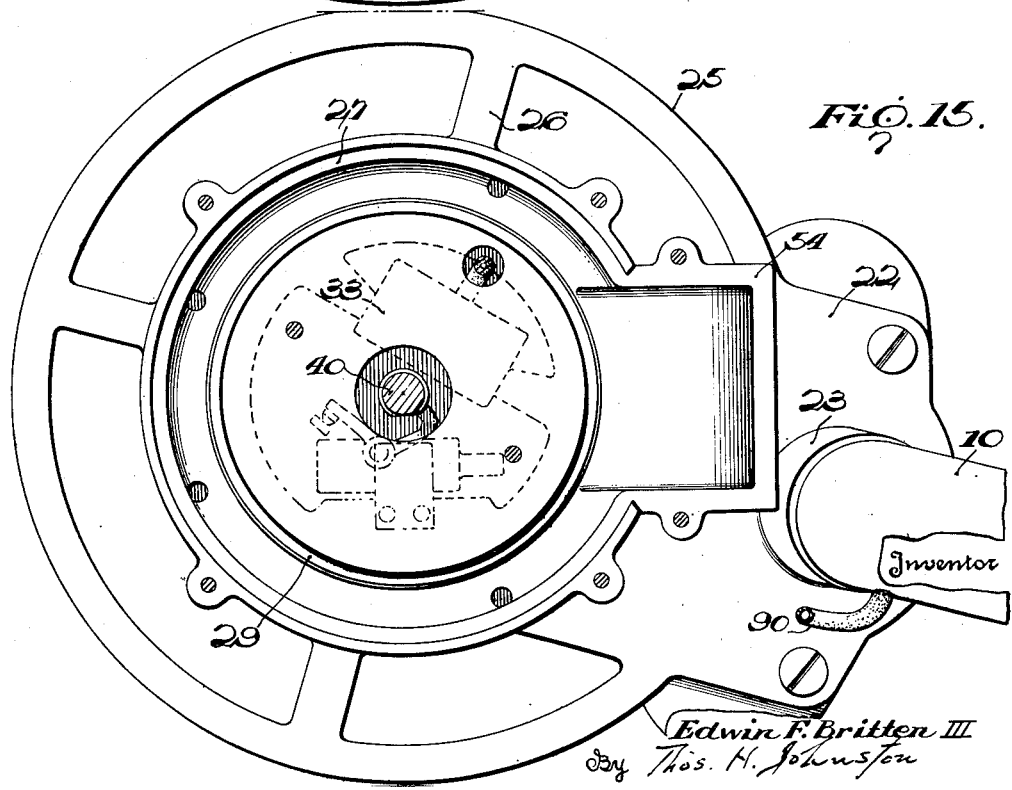
Figure 15 is a section on the line 15—15 of Figure 4.

It is now to be noted that the fan housing 27 is, as particularly seen in Figures 14 and 15 of the drawings, provided at one side thereof directly beneath the overhanging engine cylinder 47 with a rectangular air outlet 54, and removably secured to said outlet is a rectangular air flue 55, seen in detail in Figure 22 of the drawings. As shown, the flue is open at its inner side so that the right and left side walls of said flue may, as seen in Figure 14, straddle the outer end portion of the engine cylinder, while the outer side wall of said flue, as more particularly seen in Figure 22, is cut away to provide an air exit 56 about the cylinder head 48.

Detachably mounted upon the engine cylinder 47 at its upper side is an exhaust manifold 57 having depending flanges 58 straddling the right and left side walls of the air flue 55, to which walls said flanges are removably secured. As perhaps best seen in Figure 8, the exhaust manifold overhangs the outer end portion of the cylinder 47, transversely thereof, and is provided at its lower side with an upwardly and outwardly inclined baffle wall 59, while at one end of said manifold is provided an exhaust tube 60.

Detachably mounted upon the manifold 57 is an exhaust port liner unit, indicated as a whole at 61. As this unit has been made the subject of a prior patent, it is unnecessary herein to go into the details thereof, except to note, for the purposes of present understanding, that said unit includes a plurality of exhaust port liner tubes 62, best seen in Figures 7 and 9, which tubes may, by manual withdrawal of the unit, be removed from said ports for cleaning. The tubes 62 connect the exhaust ports of the engine cylinder with the exhaust manifold 57, so that the exhaust gases from said cylinder may flow through the manifold to issue through the exhaust tube 60.

Closing the crank case 46 at its upper end is a removable head 63 on one side of which is integrally formed, as best seen in Figure 7, a lateral inlet duct 64 providing an air inlet passage 65 leading therethrough into the head. Journaled through the head is a removable valve 66, shown in detail in Figure 13 of the drawings. At its lower end, this valve carries a cheek plate 67 which overlies the connecting rod 53 of the engine piston and parallels the cheek plate 44 of the engine crank shaft 40. Formed in the cheek plate 67 is a notch 68 which more or less freely receives the upper end of the crank pin 41. Thus, the valve 66 will be caused to rotate with the crank shaft, while, also, as will be perceived, the valve may be manually turned for initially rotating said shaft and starting the engine. Fitted in the upper end of the head 63 to surround the upper end portion of the valve is a gland 69, and fixed to the upper end of the valve is a starting pulley 70 to which a suitable cord may be detachably connected, as will be well understood, for starting the engine. At its lower end portion, the valve 66 is axially cored to provide a passage 71 terminating at its upper end in a lateral port 72 adapted to intermittently communicate with the inner end of the passage 65 of the duct 64 as the valve rotates.

Rotatable against the outer end of the duct 64, as perhaps best seen in Figures 6, 7, and 8, is a detachable spring-pressed choke valve 73 in the form of a more or less flat plate having an opening 74 adapted to register with the outer end of the passage 65 of the duct 64 when the valve is rocked in one extreme direction to open position, while, when the valve is rocked in the other extreme direction to closed position, the valve plate will cover the outer end of said passage. Formed on the valve plate are lateral flanges 75 adapted to engage the duct 64 for limiting the valve in its rocking movement in opposite directions, and connected to the lower end of the valve plate is a hand rod 76 for adjusting said valve.

The engine carburetor and associated parts may now be considered, and in this connection reference is made to Figures 6, 7, 10, 11, and 12 of the drawings.

A more or less oblong float chamber 77 is provided, which chamber is closed by a removable cover plate 78 and is detachably secured against the base flange of the crank case head 63. This chamber is provided at its lower side, in the reduced box-like rear end of said chamber, with a removable valve seat nipple 79, and, more or less centrally of the chamber, with an outlet stub tube 80, while in one side wall of the chamber is provided an air-vent stub tube 81. A removable pin 82 extends transversely between the side walls of the chamber, and journaled thereon is a sleeve 83 which carries a float rod 84 provided at one end with a suitable float 85 and adapted to engage at its opposite end with an inlet valve 86 received in the upper end of the nipple 79. Thus, the float may regulate the flow of liquid fuel through the float chamber.

Referring back now to the duct 64 of the crank case head 63, I provide, as shown in Figure 7, a removable transverse fuel tube 87, shown in detail in Figure 23 of the drawings. This tube is provided at one end with an externally threaded head 88 screwed into one side wall of the duct 64 so that the smooth portion of the tube projects through the other side wall of said duct, and formed in said tube at its upper side is an orifice 89.

Now to connect up the float chamber 77 with the fuel tube 87: A flexible tube 90, as of rubber, is connected at one end to the tank 12, as shown in Figure 1, thence extends inside the handle 10 to emerge near the lower end thereof, and, at its lower end, is connected to the nipple 79 of the float chamber 77. Another like tube 91, as of rubber, is connected at one end to the outlet stub tube 80 of the float chamber and, at its opposite end, is connected, as shown in Figure 7, to the free end of the fuel tube 87. Thus, liquid fuel will be supplied from the tank 12 to the fuel tube 87. However, I provide a manually operated pinching device for shutting off the flow through both of the flexible tubes 90 and 91, as will now be described.

Fixed to one end of the float chamber 77, as seen in detail in Figure 24 of the drawings, are studs 92 which carry a head plate 93, and screwed through said head plate is a hand-adjustable jack screw 94 operable against a cross-head 95 slidable upon said studs and behind which the flexible rubber tubes 90 and 91 are arranged to extend. Thus, by turning the screw 94, the tubes 90 and 91 may be pinched between the cross-head and the adjacent end wall of the float chamber 77 for choking off the flow of liquid fuel through said tubes.

Referring now particularly to Figure 7 of the drawings, it has been seen that liquid fuel is supplied to the fuel tube 87. Removably disposed in the passage 65 of the duct 64 of the crank case head 63 is a Venturi sleeve 96 transversely through which the fuel tube extends and holds the sleeve in position, the orifice 89 being disposed uppermost medially of said sleeve. Formed in the lower side of the head 88 of the tube 87 is a longitudinal key slot 97, and slidable over said head is a key 98 against which abuts a jam nut 99 locking the fuel tube in position. Detachably mounted upon said head is a needle valve assembly, now to be described.

As shown in detail in Figure 25 of the drawings, the needle valve assembly mentioned includes a tubular head 100 provided at its outer end with a nipple 101, and which is screwed at its inner end over the head 88 of the fuel tube 87. Received through the head 100 to extend into the fuel tube is a needle valve 102 having a head 103 screwed into the outer end portion of the bore of the head 100, and locking the needle valve in adjusted position on the head 100 is a jam nut 104. Thus, the needle valve 102 may be adjusted longitudinally of the head 100, while the head 100 may be rotatably adjusted longitudinally of the head 88 of the fuel tube 87 for positioning the inner end of the needle valve relative to the orifice 89.

Fitting the nipple 101 of the head 100 is a tubular handle 105 detachably fixed to said nipple and providing, in effect, an axial extension of said head, and interposed between the inner end of said head and the duct 64 is a spring 106 adapted to frictionally hold said head in adjusted position on the head 88 of the fuel tube 87. Thus the flow of liquid fuel aspirated by the engine piston through the orifice 89 of the fuel tube 87, as will be well understood, may be manually regulated to provide, when mixed with air drawn through the passage 65 of the duct 64, a combustible fuel mixture, and as the valve 66 is revolved, said mixture will be admitted through the port 72 of the valve and passage 71 to the crank case 46, to thence flow through the ducts 51 to the engine cylinder.

The remaining parts of the cutting head 11 may now be considered.

Removably secured about the upper end of the engine above the cover plate 32 of the fan housing 27 and forwardly of the exhaust manifold 57 is a jacket 107, and, as seen in Figures 6 and 7 of the drawings, the parts 76, 81, 94, and 105 project freely through said jacket. This jacket is provided at its forward side with a screened window 108 through which air may be admitted to the duct 64, and closing said jacket at its upper end is a removable cap plate 109. As best seen in Figures 4, 7, 8 and 14 of the drawings, this cap plate is provided at its rear side with a flat depending baffle-flange 110 which extends downwardly in front of the manifold 57 to straddle the inner end portion of the engine cylinder 47, and fixed to the cover plate 32, as perhaps best seen in Figure 8, is a stop plate 111 against which the flange 110 abuts, the stop plate extending upwardly to straddle the inner end portion of the cylinder 47 from the lower side thereof. Thus, excessive heating, by the outer end of the engine cylinder, of the parts enclosed by the jacket 107 will be prevented.

Removably keyed to the tail stem 41 of the crank shaft 40, as seen in Figure 5, is a head 112, and positioned medially against the lower end of the head is a cutting blade 113 detachably secured in place by an elongated cap nut 114 which extends axially of the head and is screwed onto the lower end of the tail stem. Thus, the blade 113 will turn with the crank shaft 40 and may be removed for sharpening or substitution when so desired.

The cutting blade 113 is shown in detail in Figures 18 and 19 of the drawings. As will be observed, said blade is provided at longitudinally opposite edge extremities thereof with cutting edges 115, and at correspondingly opposite edge extremities with upturned fan wings 116 slanted laterally in opposing directions with respect to the longitudinal axis of the blade. As will now be described, the edges 115 do the cutting work of grass, while the wings 116 serve as fan blades.

Looking now at Figures 4, 5, and 8 of the drawings, it will be seen that, as the blade 113 is rotated the wings 116 will develop an up-draft of air about the shoe 15. Thus, the blades of grass will be pulled upwardly to be encountered by the cutting edges 115 of the blade to be severed thereby. The updraft of air mentioned will, as will be seen, be discharged upwardly against the air dish 16 to emerge through the openings of the cover plate 17 between the inner ring 24 of said plate and the outer guard ring 25 thereof about the fan housing 27. Further, it is to be noted that since the guard ring 25 is of greater diameter than the length of the cutting blade 113, said ring will, as suggested in Figure 3, prevent the tips of the blade, in the use of the device, from striking an object when cutting close thereto.

It may now be noted that all of the parts of the whole device, with the exception of some of the elements of the magneto 33, the engine crank shaft 40, the bearings 37 and 39 for said shaft, and some small minor items of structural detail, are all preferably formed of suitable aluminum alloy, as in the embodiment of the invention shown. The blade 113 is of course, of steel. However as will be perceived, the cutting head 11 is, as a whole, light in weight and may be easily carried by the handle 10 and conveniently manipulated for cutting grass.

The provisions made for cooling of the engine and other parts remain to be further described, and in this connection reference may be made to Figure 8 of the drawings.

As has been seen, rotation of the fan 28 by the crank shaft 40 will serve to draw through the duct 14 of the handle 10 a stream of air into the air dish 16. Accordingly, it is now to be noted that the air dish is located immediately above the cutting blade 113 and close to the ground. Therefore, the air dish will be directly subjected to the cooling influences of the up-draft of cooler ground-surface air impelled thereagainst by the cutting blade, as well as any grass-moisture driven against the air dish. Thus, as will be seen, the air dish 16 will be cooled for, in turn, cooling the air stream flowing through the dish into the fan housing 27. From the fan housing, the cooling air stream in said housing is impelled upwardly and out through the outlet 54 of said housing, and thence through the air flue 55 about the outer end portion of the engine cylinder 47 to issue partly through the exit 56 of said flue and partly against the inclined baffle wall 59 of the exhaust manifold 57. Accordingly, as will be appreciated, excess heat at the outer end portion of the engine cylinder will be carried off to afford efficient functioning of the engine while, also, the portion of the exhaust manifold immediately above the outer end of said cylinder will be somewhat cooled so that the proximity of the parts may not tend toward over-heating of the cylinder.

Finally, another feature to be noted is that moisture from the grass being cut may not find entrance into the air dish 16, the fan housing 27, and fan casing 29 to affect the magneto 33, or other vital parts of the cutting head 12. The device may thus be used in the early morning when dew is on the grass, or after a rain, with entire efficiency.

Having thus described my invention, I claim:

1. In a grass trimmer, a cutting head including a horizontal air dish disposed close to the ground when the head is in use, a fan housing upstanding from said dish and mounted thereon, an engine mounted on top of said housing and including a cylinder and crank shaft the latter of which extends through the housing and dish, a cutting blade operatively connected with the lower end of said shaft and operable by the shaft in a zone close below said dish, the dish and housing providing an air passage therethrough closed with respect to the zone of operation of said blade and having an outlet disposed to discharge air from said housing about the cylinder for cooling the same, means carried by the shaft within said housing and operable by the shaft to induce a current of air through said passage, said dish having a bottom wall, and a bearing mounted upon said wall and journaling the shaft near its lower end.

2. In a grass trimmer, a cutting head including a horizontal air dish disposed close to the ground when the head is in use, a fan housing upstanding from said dish and mounted thereon, an engine mounted on top of said housing and including a cylinder and crank shaft the latter of which extends through said housing and dish, a cutting blade operatively connected with the lower end of said shaft and operable by the shaft in a zone close below said dish, said dish and housing providing an air passage therethrough closed with respect to the zone of operation of said blade and having an outlet disposed to discharge air from said housing about the engine cylinder for cooling the same, a casing fixed to the crank shaft to turn therewith within said housing, a head plate closing said casing and fixed to said housing stationary with respect to said casing, a magneto mounted within said casing and operatively connected with the engine cylinder, a spring surrounding the shaft within the casing and acting on the casing to prevent grinding of the casing against said head plate when the casing is turned, and means carried by said casing and rotatable thereby for inducing a current of air through said passage.

3. In a grass trimmer, a cutting head including a horizontal air dish disposed close to the ground when the head is in use, a fan housing upstanding from said dish and mounted thereon, an engine mounted on top of said housing and including a cylinder and crank shaft the latter of which extends through said housing and dish, a cutting blade operatively connected with the lower end of said shaft and operable by the shaft in a zone close below said dish, the dish and housing providing an air passage therethrough closed with respect to the zone of operation of said blade and having an outlet disposed to discharge air from said housing about the engine cylinder for cooling the same, means carried by the shaft within said housing and operable by the shaft to induce a current of air through said passage, and means carried by the blade and operable thereby for blowing a current of air upwardly about said dish for cooling the dish and the current of air flowing therethrough.

4. In a grass trimmer, a cutting head including an internal combustion engine having a crank shaft, a cutting blade operably connected with said shaft for rotation thereby in a cutting zone, means of hollow construction mounting said engine and providing a passage having an intake for a current of air flowing through the passage for cooling the engine, said passage being closed with respect to said cutting zone, and a length of pipe open at its ends and fixed at one end in said intake to provide a handle for the head, the outer open end of the pipe providing an air inlet disposed at a point remote from said cutting zone and connected by the passage through the pipe with said intake.

5. In a grass trimmer, a cutting head including an internal combustion engine having a crank shaft, a cutting blade operably connected with said shaft for rotation thereby in a cutting zone, means mounting said engine and of hollow construction providing a passage having an intake for a current of air flowing through the passage for cooling the engine, said passage being closed with respect to said cutting zone, and an elongated staff providing a handle fixed at one end in said intake and formed at its opposite end with an air inlet disposed at a point remote from said cutting zone, said handle being tubular and providing an air passage therethrough connecting said inlet with said intake.

6. In a grass trimmer, a cutting head including an internal combustion engine having a crank shaft, a cutting blade operably connected with said shaft for rotation thereby in a cutting zone, means mounting the engine and disposed immediately above said blade, said means being of hollow construction providing a passage having an intake for a current of air flowing through the passage for cooling the engine, the passage being closed with respect to said cutting zone and a wall of said passage forming the upper limit of said zone, and an elongated staff providing a handle fixed at one end in said intake and formed at its opposite end with an air inlet disposed at a point remote from said cutting zone, said handle being tubular and providing an air passage therethrough connecting said inlet with said intake.

7. In a grass trimmer, a cutting head including a flat hollow air dish disposed with its lower side close to the ground when the head is in use and provided with an air intake, an engine having a crank shaft extending into said dish, a cutting blade operably connected with said shaft and operable by the shaft in a zone close below said dish, and a fan housing disposed between said engine and dish connecting the engine and dish with each other and receiving said shaft therethrough, said housing being provided with an outlet disposed to discharge air about the engine for cooling the same and said dish and housing providing an air passage therethrough closed with respect to the zone of operation of said blade and connecting said intake with said outlet.

8. In a grass trimmer, a cutting head including a flat hollow air dish disposed with its lower side close to the ground when the head is in use, a cover plate fixed to the dish at its upper side and provided with a guard ring as well as with an air intake, an engine having a crank shaft extending into said dish, a cutting blade operably connected with said shaft and operable by the shaft in a zone close below said ring, the blade being shorter than the diameter of the ring, and a fan housing disposed between said engine and dish connecting the engine and dish with each other and receiving said shaft therethrough, said housing being provided with an outlet disposed to discharge air about the engine for cooling the same and said dish and housing providing an air passage therethrough closed with respect to the zone of operation of said blade and connecting said intake with said outlet.

9. In a grass trimmer, a cutting head including a hollow air dish provided with an air intake, an engine having a crank shaft extending into said dish, a cutting blade operably connected with said shaft and operable by the shaft in a zone close below said dish, a fan housing disposed between said engine and dish connecting the engine and dish with each other and receiving said shaft therethrough, said housing being provided with and outlet disposed to discharge air about the engine for cooling the same and said dish and housing providing an air passage therethrough closed with respect to the zone of operation of said blade and connecting said intake with said outlet, and an elongated staff providing a handle fixed at its inner end in said intake and formed at its outer end with an air inlet, said handle being of tubular construction and providing an air passage therethrough connecting the inlet of the handle with said intake.

10. In a grass trimmer, a cutting head including a hollow air dish provided with an air intake, an engine having a crank shaft extending into said dish, a cutting blade operably connected with said shaft and operable by the shaft in a zone close below said dish, a fan housing disposed between said engine and dish connecting the engine and dish with each other and receiving said shaft therethrough, said housing being provided with an outlet disposed to discharge air about the engine for cooling the same and said dish and housing providing an air passage therethrough closed with respect to the zone of operation of said blade and connecting said intake with said outlet, means carried by the crank shaft within said housing and operable by the shaft to induce a current of air through said passage, and means on said blade and operable thereby for blowing a current of air upwardly about said dish for cooling the dish and the current of air flowing therethrough.

EDWIN F. BRITTEN, III.

REFERENCES CITED

The following references are of record in the file of this patent:

UNITED STATES PATENTS

| Number | Name | Date |
|---|---|---|
| Re. 21,289 | Orr | Dec. 5, 1939 |
| Re. 23,146 | Packwood | Sept. 13, 1949 |
| | (Original No. 2,445,965) | |
| 1,751,739 | Jacobsen | Mar. 25, 1930 |
| 2,172,992 | Stegeman | Sept. 12, 1939 |
| 2,208,972 | Goodall | July 23, 1940 |
| 2,259,676 | Winchell | Oct. 21, 1941 |
| 2,397,457 | Krenzke | Mar. 26, 1946 |
| 2,427,265 | Dreischerf | Sept. 9, 1947 |
| 2,519,779 | Moon | Aug. 22, 1950 |